United States Patent Office 3,551,790
Patented Dec. 29, 1970

3,551,790
TRANSDUCER FOR CONVERTING MECHANICAL FORCE TO AN ELECTRIC OUTPUT SIGNAL
Arkady Matveevich Shapiro, Ul. Anagskaya 38, kv. 30; Ripsime Grigorievna Sisoyan, pl. Lenina 4; Anzor Markozovich Alania, Ul. Barnova 26; Teodör Maiseevich Shnaider, Ul. Merkviladze 4V.; and Mikhail Grigorievich Goldman, Ul. Atarbekova 2, all of Tbilisi, U.S.S.R.
Filed Feb. 20, 1968, Ser. No. 706,878
Int. Cl. H02p *13/10;* H02m *5/12*
U.S. Cl. 323—51                    2 Claims

ABSTRACT OF THE DISCLOSURE

A transducer for converting mechanical force into an electric output signal comprises two identical ferromagnetic bodies each made as stacks of annular plates which have natural curvature and are disposed in contact on top of one another. The ferromagnetic bodies carry windings. One of said ferromagnetic bodies is mounted on a dividing partition in the upper part of a casing, the ferromagnetic body serving as an active element capable of sensing the force to be measured. The other ferromagnetic body is arranged in the lower part of the casing, and is employed as a passive element. The plates of the ferromagnetic bodies of the active and passive elements are disposed one above the other leaving air clearances therebetween and they are capable of bending resiliently and compressing to reduce the air clearance therebetween, thereby increasing the density of the eddy currents in the body with decreasing the total resistance of the primary element winding. The windings of the active and passive elements are connected in series with the symmetrical sections of the primary winding of a matching transformer and in parallel with a variable voltage source.

The invention relates to electrical measuring instruments, mainly for remote measurements of forces due to weight, pressure and other mechanical effects that are to be subjected to automatic control, regulation and operation.

There are known a large number of force-responsive transducers based on various methods of converting mechanical forces into electrical values.

Transducers based on a change of the impedance of an electromagnet winding effected by a force to be measured are most often employed in automatic control systems.

The so-called inductive transducers comprising a magnetic circuit with a variable air gap have low accuracy.

A substantial disadvantage of magnetically resilient transducers is the complexity of their manufacture.

For example, when assembling these transducers the bars of magnetic cores must be specially oriented relative to the direction of rolling, which considerably complicates the process of assembling.

Another disadvantage of the magnetically resilient transducers is their relatively low sensitivity when the applied mechanical stresses are small, which limits the range of their application to measuring large forces (e.g., pressure in rolling mills, weight of railway cars, etc.) causing mechanical stresses in the transducer of the order of 15 to 20 kg./sq. mm. Under operating forces less than 1 kg./sq. mm. the sensitivity of magnetically resilient transducers is very low.

It is, therefore, an object of the present invention to provide a force-responsive transducer highly sensitive in a wide range of force measurements and simple in manufacture.

With this and other objects in view, the invention is aimed at providing a force-responsive transducer whose primary element is sensitive to large and very small mechanical stresses.

This aim is achieved in a force-responsive transducer in which, according to the present invention, the active and passive primary elements are identical in form and size and comprise magnetic cores assembled of separate members which are arranged with air clearances between them so that they can be elastically drawn to each other, thereby changing the size of the clearances and the winding impedance of the primary element.

It is preferred to form the magnetic core of the primary element as a hollow cylinder assembled of annular plates of transformer steel which are arranged with air clearances between one another in a nonmagnetic tube.

An advantage of such embodiment of the invention is a considerable increase of sensitivity due to a change of the eddy current power when the magnetic core members are drawn to each other.

Figure 1:
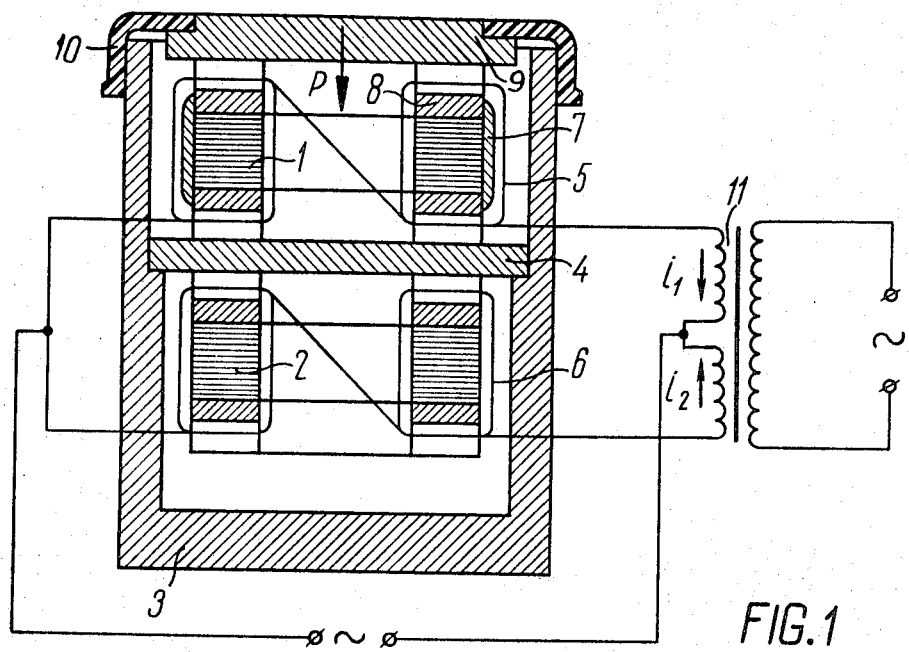
Figures 2, 3:
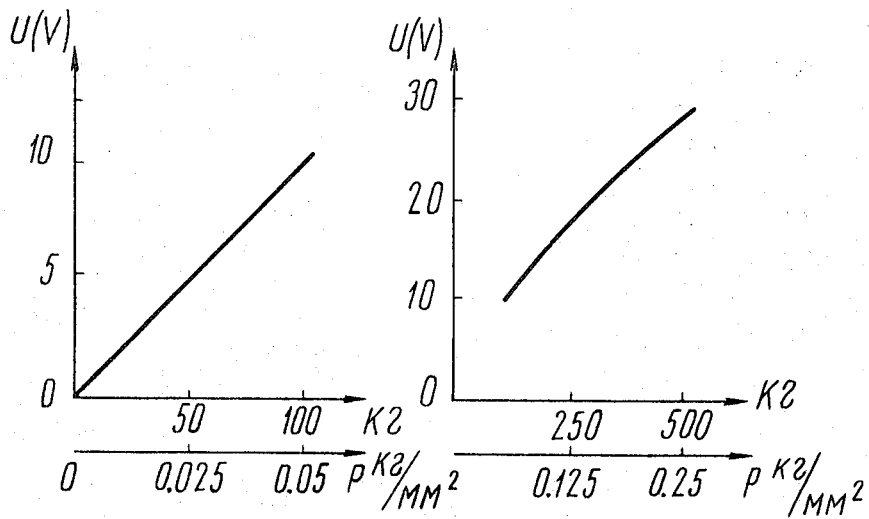

The invention is further illustrated by the following description with reference to the accompanying drawings, in which:

FIG. 1 is a schematic representation in longitudinal cross section of a force-responsive transducer in accordance with the invention; and FIGS. 2 and 3 are graphs of the response of the transducer to forces in the range of 0 to 100 kg. and of 100 to 500 kg.

An active primary element 1 and a passive primary element 2 of the transducer (FIG. 1) are identical in design and are placed in a steel cylinder 3, the active element 1 being fixedly attached to a partition 4, and the passive element 2 being suspended from the partition.

The magnetic cores of the primary elements 1 and 2 are assembled from plates covered with insulating varnish and shaped, for example, as rings punched from transformer steel. The magnetic cores accommodate windings 5 and 6.

The active element 1 is assembled from plates in a nonmagnetic tube 7 and senses a force through a cushion 8 and a steel disc 9 sealed with a rubber ring 10.

The magnetic core of the active element 1 is assembled from plates with air clearances between them which can decrease under the effect of a force being measured. The size of the clearances formed between the plates due to their natural curvature amounts to 10–15 microns.

Under the effect of the force P on the disc 9 the plates straighten and the distances between them decreases. The straightening of the plates under the effect of force being converted is in fact the bending strain. When the mechanical force is not applied to the plates, they assume their initial position and the air clearances between them appear again.

Thus, the first stage of the transducer operation comprises conversion of a mechanical force into the elastic change of the distances between the plates of the active element 1.

The second stage of the transducer operation comprises conversion of the distance change between the plates of the active element 1 into the impedance change of an A.C. winding 5.

There is no operating magnetic flux in the clearances between the steel plates (it is closed in the steel material and the clearance magnetic flux may be neglected because of its insignificance), but there is an eddy current magnetic field of the steel plates which is perpendicularly directed to the power lines.

When the surfaces of the plates are drawn to each other, the normal magnetic field of the eddy currents causes a power increase of the core eddy currents which is proportional to the impedance decrease of the winding 5.

The impedance of the winding 6 of the passive element is invariable because the element 2 is freely suspended from the partition 4 and is not affected by the force P.

The windings 5 and 6 of the active and passive elements are connected in series to the primary winding sections of a matching transformer 11.

In the initial state, currents $i_1$ and $i_2$ are equal and opposite due to the complete circuit balance and the resulting magnetic flux of the transformer and the primary winding E.M.F. are equal to zero. When the active element is compressed by the force P, current $i_1$ increases and current $i_2$ decreases, which causes the resulting magnetic flux in the core of the transformer 11 and the proportional voltage in the secondary winding.

FIGS. 2 and 3 show the transducer characteristics $\mu = f(p,\sigma)$, in which:

$\mu$—voltage at the transducer output in volts;
P—mechanical force, in kg.;
$\sigma = P/S$—mechanical tension in the transducer core in kg./sq. mm.;
S—cross-sectional area of the transducer core.

As seen from FIG. 2, the initial transducer sensitivity in the range of 0 to 0.05 kg./sq. mm. is 0.1 volt/kg.

None of the known force-responsive transducers possess such high sensitivity.

The test model of the transducer provided by the invention has proven highly accurate, reliable and stable under operating conditions. The greatest transducer error did not exceed 1 percent. The lifetime is not less than 10,000 hours.

What is claimed is:

1. A transducer for converting mechanical force into an electric output signal comprising a hollow metal casing; a dividing partition in said casing; an active primary element mounted on one side of said partition in the casing to sense a force applied to the casing in one direction, said active element being constituted as a stack of ferromagnetic plates having natural curvature and disposed on top of one another in contact so that under the effect of said force clearances between the plates are closed; a passive element identical in shape and size to said active element and disposed within the casing so as to be insensitive to the applied force; electric windings on said active and passive elements; and a matching transformer having a primary winding connected in series with said windings of the elements so that the closure of the clearances between the plates causes variations in the density of the eddy currents and in the output signal in the secondary winding of the matching transformer.

2. A transducer according to claim 1 in which the active primary element includes a magnetic core which is shaped as a hollow cylinder assembled of said plates which are annular in shape and constituted of transformer steel, and a nonmagnetic tube receiving said plates.

References Cited

UNITED STATES PATENTS

| | | | |
|---|---|---|---|
| 3,056,099 | 9/1962 | Dvorácek | 336—20 |
| 3,142,794 | 7/1964 | Pegram | 323—51 |
| 3,213,395 | 10/1965 | Glerum | 336—30 |
| 3,421,126 | 1/1969 | Ames | 73—398X |

J. D. MILLER, Primary Examiner

G. GOLDBERG, Assistant Examiner

U.S. Cl. X.R.

73—141; 323—53; 336—20, 30, 134; 340—199